United States Patent Office 3,651,237
Patented Mar. 21, 1972

3,651,237
TREATING OF AGGRESSION AND REDUCTION OF FATIGUE SYNDROMES WITH L-TYROSINE
Henri Laborit, Paris, France, assignor to Centre d'Etudes Experimentales et Cliniques de Physiobiologie de Pharmacologie et d'Eutonologie
No Drawing. Filed Feb. 11, 1970, Ser. No. 10,658
Int. Cl. A61k 27/00
U.S. Cl. 424—319
1 Claim

ABSTRACT OF THE DISCLOSURE

A pharmaceutical composition for the treatment of shock which comprises L-tyrosine in a 5 to 10% solution of glucose in water, which composition when administered brings about the restoration of a working reserve of catecholamines and thus maintains normal metabolic activity. The administration of the composition acts to relieve symptoms of body fatigue in mammals.

---

This invention is concerned with pharmaceutical compositions useful for the treatment of states of shock.

It is known that catecholamines are stored in the body, in an inactive form, in granules in the interior of nerves and nerve cells. Catecholamines must be liberated from these granules in order to act, but their liberation leads to their rapid catabolism and inactivation.

Certain syndromes of aggression (for example, various states of shock) are accompanied by a massive liberation of catecholamines. The prevention of these states requires the use of drugs which can inactive catecholamines (adrenolytic drugs). However, when the state of shock is established, it is found that the granules are depleted and that the restoration of their reserves is slow or even impossible with conventional therapeutic agents. These intragranular reserves are necessary for the maintenance of a normal metabolic activity but the restoration of these reserves by the administration of catecholamines is contra-indicated because the latter have prejudicial vasomotor effects.

This invention is based on the discovery that a catecholamine precursor, L-tyrosine, has substantially reduced vasomotor effects as compared with catecholamines themselves and that its administration brings about the restoration of a working reserve of catecholamines.

The following facts have been established experimentally using rabbits:

(1) The administration of L-tyrosine in cases of irreversible haemorrhagic shock enabled 57.5% of the rabbits to survive for 24 hours or more and 12.5% of the rabbits to survive completely.

(2) Stereotaxic studies have shown that the cerebra cortex no longer responded to stimulations with the threshold intensities of different cerebral areas (posterior hypothalamus, mesencephalic reticular formation, hippocampus). However, thirty to sixty minutes after the perfusion of L-tyrosine, the cortical responses were restored.

(3) Certain pharmacological agents are known to activate the synthesis of catecholamines from tyrosine; for example, phenothiazines, particularly chlorpromazine. However, the cerebral cortex response, lost after subcortical stimulation in the course of irreversible haemorrhagic shock, was restored much more rapidly and more completely by L-tyrosine when it was used with chlorpromazine, the activity of the latter as such being, however, centrally depressive.

(4) Certain other pharmacological agents are known to liberate catecholamines from the granules and to impede their restoration, for example reserpine. It has been found that when mice were treated with reserpine, a large drop in their stomach temperature occurred. However, the administration of L-tyrosine effectively opposed this thermal drop. Likewise chloropromazine is known as a powerful hypothermia-inducing agent, no doubt working by hindering the release of catecholamines from their granules. However, in certain doses, combined with tyrosine, it opposed this drop in temperature of the reserpine-treated animal.

(5) Certain agents containing SH groups are apparently capable of impermeating the granular membranes and of limiting the release of catecholamines after the restoration of the reserves by L-tyrosine.

Certain therapeutic applications are envisaged for the administration of L-tyrosine:

(1) For aggression syndromes, generally, in order to restore the granular reserves of catecholamines and a normal metabolic activity, and this particularly in medical and surgical reanimation.

(2) For central depressive syndromes and for the indications generally arising from the administration of antidepressants such as IMAO or those not having anti-aminooxidasic activity. It may be used similarly in Parkinson's disease, in the course of which the dopamine is less abundant in the striatum level.

(3) The majority of psychotropic agents intervene directly or indirectly with the liberation, catabolism, restoration, or synthesis of catecholamines, and it is envisaged that they may be administered in combination with L-tyrosine with a view to potentiating or diverisfying their pharmacological and therapeutic activities or correcting their deleterious side-effects.

This therapeutic orientation is also valuable for antidepressants as well as for major antipsychotropics (phenothiazines, reserpine), tranquillisers, and, finally, analgesics because of the part which the central adrenergic system appears to play in morphinic analgesia.

(4) For certain more general syndromes, both central and peripheral, such as "tiredness," rather than attempting to release catecholamines from their granules by the administration of amphentamines, it appears more logical to ensure the restoration of the catecholamine reserves, while leaving the organism to use these reserves according to the exigencies of energy imposed by the environment.

(5) The combination of L-tyrosine with molecules capable of supplying SH groups also appears to constitute an effective combination for the intra-granular maintenance of reserves of reconstituted catecholamines.

For clinical therapy, L-tyrosine is preferably administered in solution in a 5 to 10% solution of glucose in water, this solution containing 100 mg. of tyrosine per 100 ml. and the solution being administered intravenously, drop by drop.

Oral administration can also be used but is complicated by the fact that tyrosine only passes slowly through the intestinal wall.

What I claim is:

1. A process for treating aggression and reducing fatigue syndromes in animals comprising intravenous administration to the subject of a 1 mg./ml. solution of L-tyrosine in a 5–10% glucose solute.

References Cited

UNITED STATES PATENTS 2,738,299   3/1956   Frost et al. _____ 424—319

FOREIGN PATENTS 931,016   7/1963   Great Britain _____ 424—319

OTHER REFERENCES

Grollman, Pharmacology and Therapeutics, 6th ed. (1965), pp. 298–299.

STANLEY J. FRIEDMAN, Primary Examiner